Patented Jan. 1, 1952

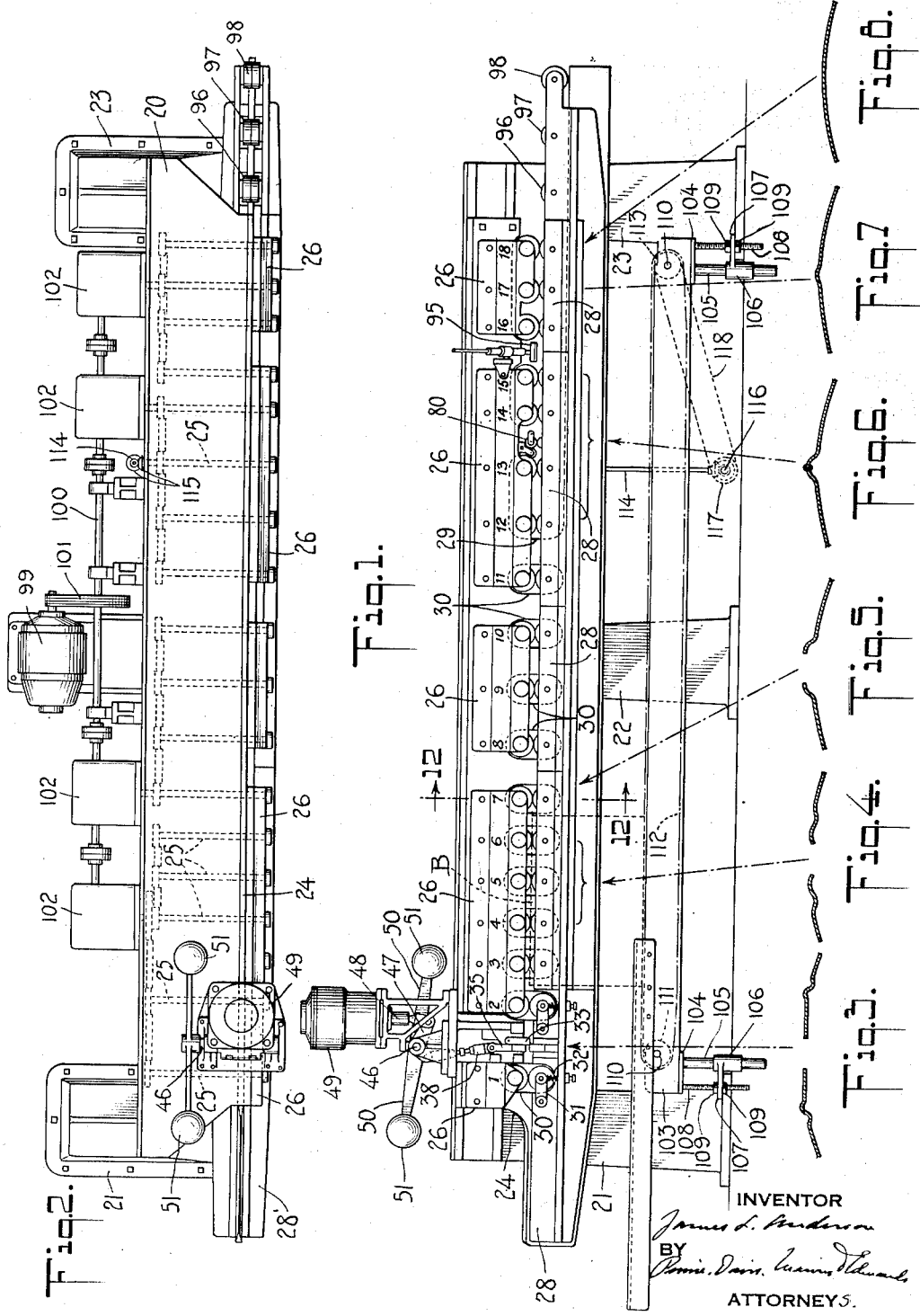

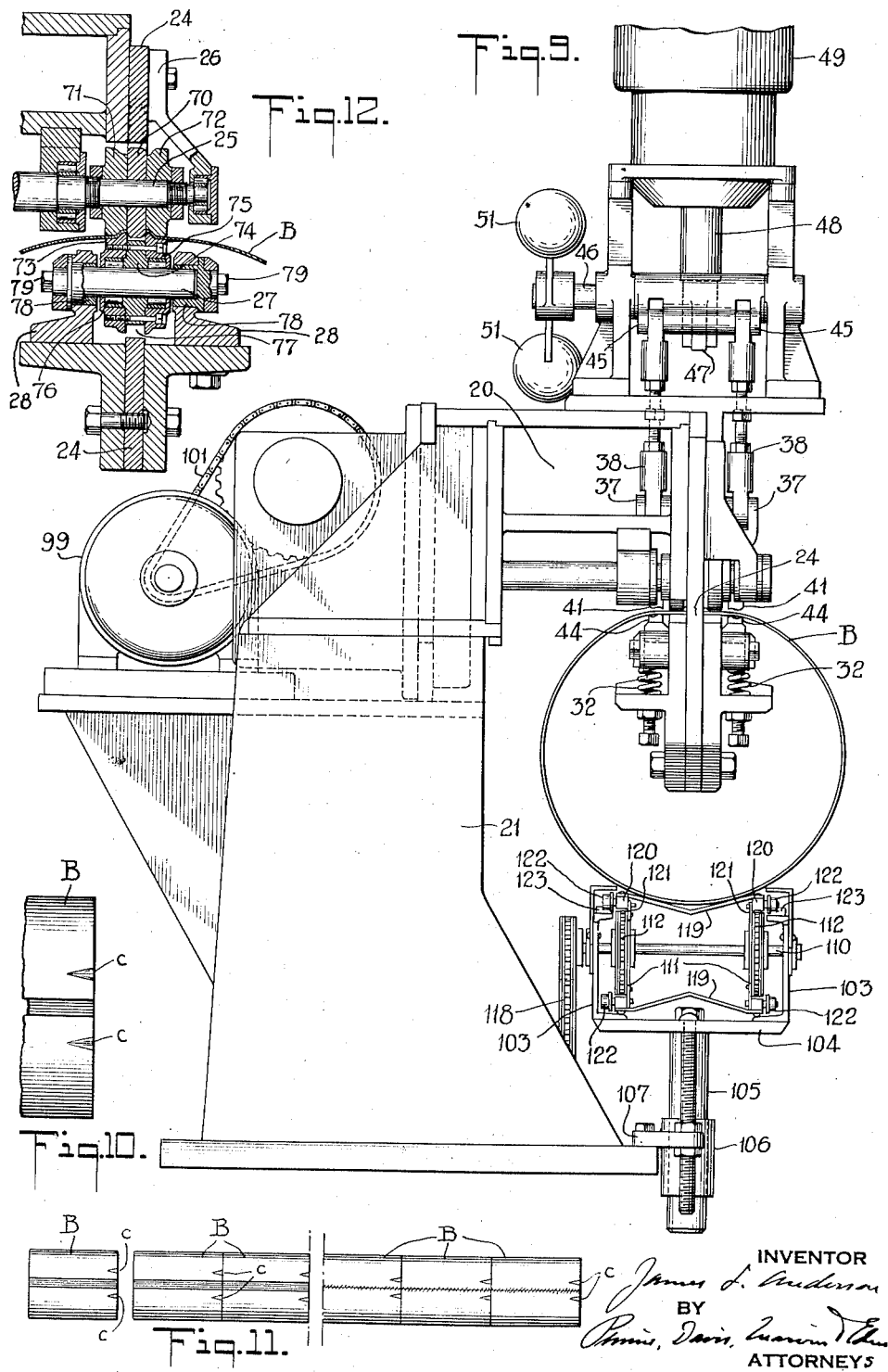

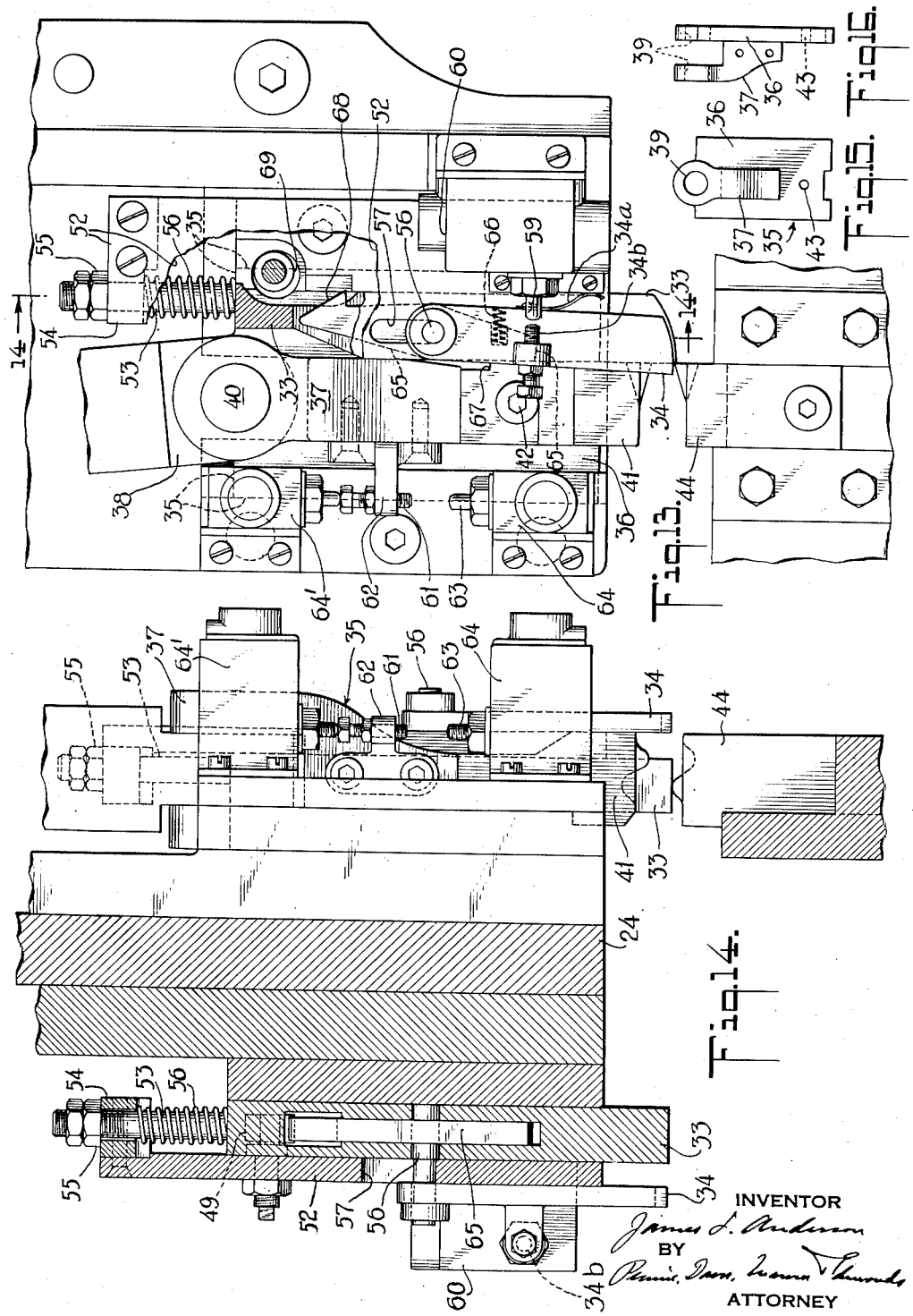

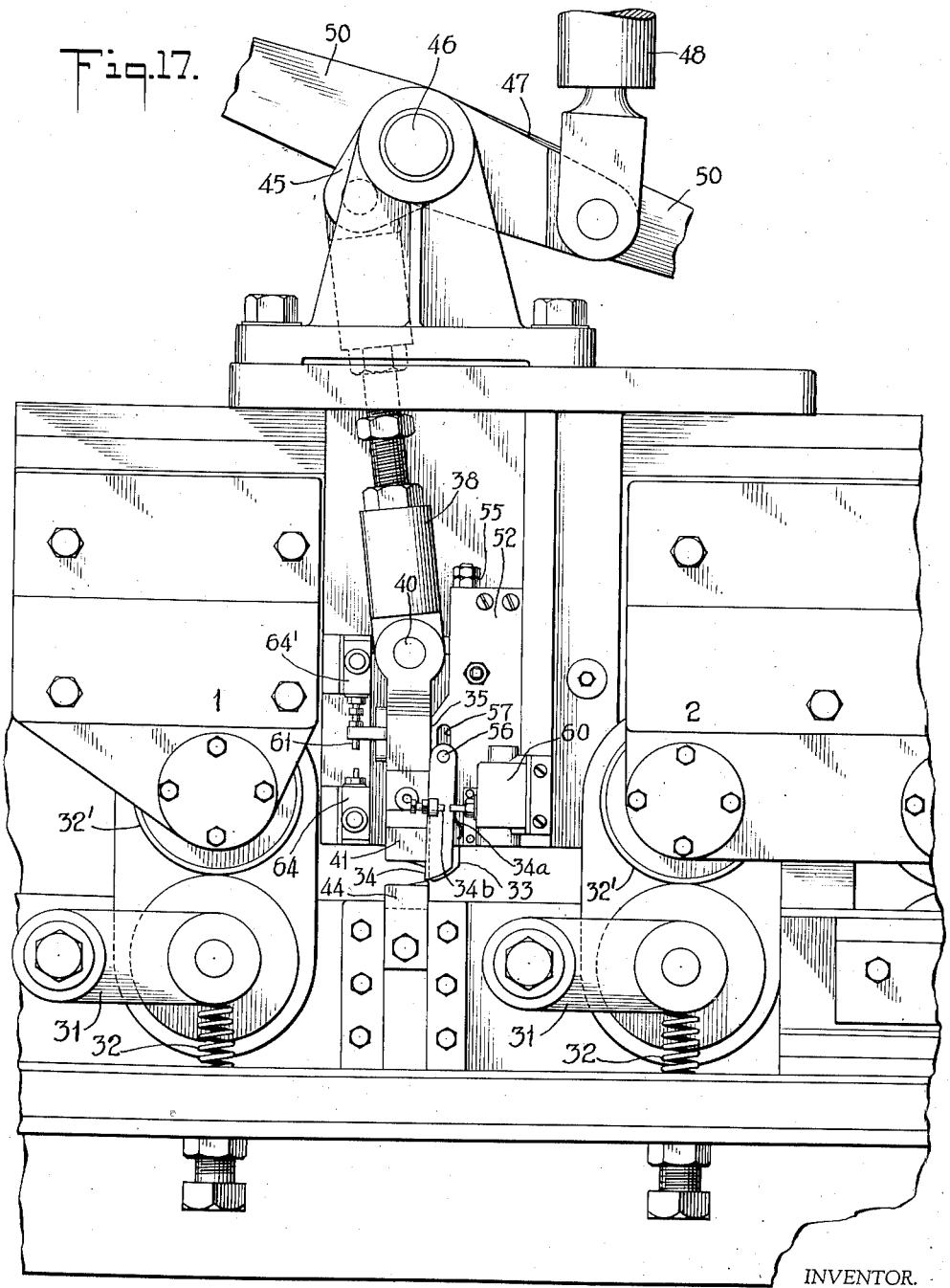

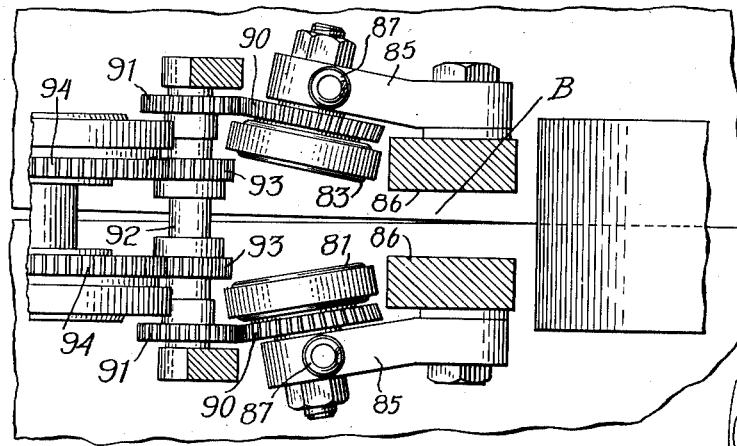
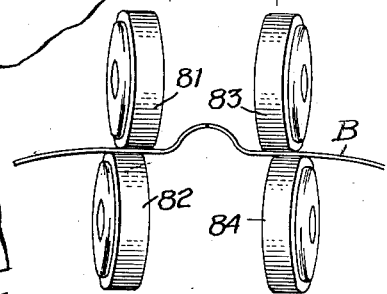
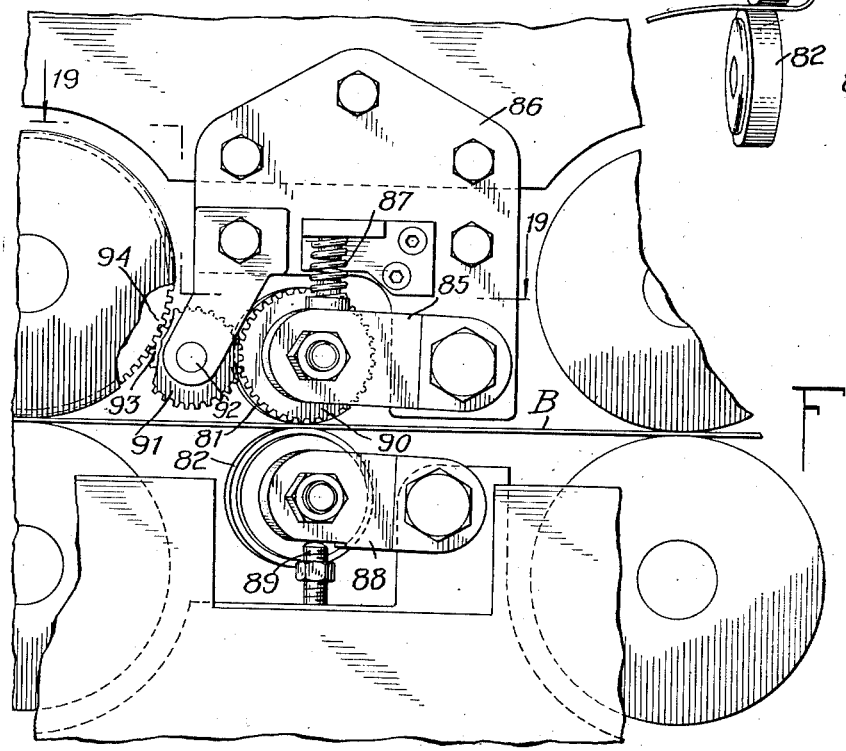

2,580,502

UNITED STATES PATENT OFFICE 2,580,502

METHOD AND APPARATUS FOR WELDING THE LONGITUDINAL SEAMS OF BARREL BLANKS AND THE LIKE

James L. Anderson, Closter, N. J., assignor to Air Reduction Company, Incorporated, a corporation of New York Application October 3, 1945, Serial No. 620,006

12 Claims. (Cl. 113—112)

This invention relates to a method and apparatus for welding the seams of light gauge metal objects, and more particularly to a method and apparatus for welding the longitudinal seams of tubular blanks of relatively large diameter and made of thin sheet metal such as shells or blanks used for the body portion of barrels, drums and other containers.

When welding a seam along the meeting edges of light gauge metal sheets or plates or the longitudinal seam of tubular blanks made of light gauge metal, the localized expansion of the metal due to the heat tends to produce a wavy condition in the edges of the work along the seam because of the thinness of the metal. Attempts have been made to prevent this by preparing the edges for welding by turning up a narrow strip of the metal along each edge of the seam to be welded to form in effect short upstanding flanges which are brought into engagement and then welded together, or by resorting to clamping of the metal along the seam while the seam is being welded. The first method is objectionable because of the difficulty in turning up the short edge portions and therefore seldom used. Moreover, this method results in the formation of a heavy bead on the top surface of the work at the seam and an underside depression. The second method is objectionable because of low production due to the time required for clamping, welding and removing the welded work, and also because the welding time is slow since the clamping which is necessarily close to the seam edges robs the metal of heat. Also, the close clamping necessitates the use of heavy welding flames to overcome the heat conduction losses.

The principal object of this invention is to provide a method by which the seams of light gauge metal objects can be satisfactorily welded, such method being free of the above-mentioned objections to prior methods. A further object is to improve in other respects the usual methods of welding seams and particularly the longitudinal seams of barrel blanks and the like.

Other objects of the invention are to provide improved apparatus for carrying out the method and improved apparatus that is particularly adapted for welding the longitudinal seams of barrel blanks and the like.

In accordance with one feature of the invention the edges of the light gauge metal along the seam to be welded are progressively formed into a shape such that together they produce an upwardly projecting rib or corrugation of semi-circular cross-section which constitutes in effect the upper half of a small diameter tube with the seam to be welded at its top. This stiffens the edges of the metal against the formation of waves which would otherwise occur because of localized expansion of the metal from the welding heat, and also facilitates progressive movement of the work through the welding machine and under the welding means. It also makes it unnecessary to support the thin metal at the time of welding close to the seam by clamping means or other type of support that would withdraw heat from the welding region by conduction. After the edges along the seam are thus stiffened the edge faces are progressively brought into proper relation for welding and are moved under a welding torch or other welding means to progressively weld them together. Subsequent to the welding operation the raised or humped up portion that forms the stiffening corrugation is rolled down to eliminate the corrugation. The rolling down of the corrugation compresses the heated metal in the weld circumferentially. The weld, which is thicker than the work material, is rolled while it is hot to change it from cast to wrought form. This rolling of the hot seam also lengthens it or extends it lineally and restores its original length and thereby compensates for contraction and longitudinal distortion that occurs during welding.

When welding barrel blanks by the method of this invention the tubular metal blanks are in abutting end-to-end relation during the welding operation with their unwelded seams in alignment so as to form in effect a continuous tube and a continuous seam which is to be welded progressively along its length. The series of blanks are moved under the welding means to progressively weld the seam of the relatively long tube thus made up of the individual blanks. In this way each blank (with the possible exception of the first and last of the series) is equally heated at both ends of the seam and satisfactorily welded at both ends since the metal at the junction points of the blanks is in effect continuous. The welded blanks are connected to one another at the seam ends but may be easily broken apart at these small points of connection.

As each blank enters the machine it is crimped at its forward end to form a few crimps which extend back a short distance from the blank's forward edge so that the blanks can be crowded against one another as they move through the machine in abutting relationship without telescoping or riding up on one another.

Since the blanks are made of relatively light gauge metal they are supported from below on a conveyor during their travel through the machine and during the welding operation so that the blanks in distorting do not change their position in the rolls between which the seam edges pass. The conveyor is driven to cause the lower portions of the blanks resting on it to move at the same speed as the seam edges passing between the rolls to avoid any drag on the lower portions of the blanks which would change the edge position and affect the welding operation.

The accompanying drawings illustrate a welding machine embodying the apparatus features of the invention which was designed to weld the longitudinal seams of barrel blanks and the like in accordance with the new method.

In the drawings:

Figure 1 is a side elevation of the machine;

Figure 2 is a plan view thereof;

Figures 3 to 8, inclusive, are explanatory views showing the cross-sectional shape of the edge portions of the blank along the seam at different stages during the passage of the blank through the machine;

Figure 9 is an end elevation of the feed end of the machine, this figure being drawn to a larger scale than that used in Figures 1 and 2;

Figure 10 is a plan view of the forward end of one of the blanks showing how its forward edge is crimped at either side of the seam by the crimping mechanism shown in Figure 9;

Figure 11 is a more or less diagrammatic view to illustrate how the blanks pass through the major portion of the machine in abutting relationship to form in effect a continuous tube and a continuous seam;

Figure 12 is a vertical transverse section through one of the pairs of forming rolls that hump up the longitudinal edge portions of the blank along the seam as above described;

Figure 13 is a side elevation of the crimping mechanism;

Figure 14 shows in end elevation that portion of the mechanism which crimps the forward edge of the blank at one side of the seam and shows in vertical section some of the crimping mechanism which does the crimping at the other side of the seam, the section being taken approximately on the line 14—14 of Figure 13;

Figures 15 and 16 are front and side elevations, respectively, of the hammer of the crimping mechanism drawn to a reduced scale;

Figure 17 is a side elevation of that portion of the machine where the crimping mechanism is located;

Figure 18 is a side elevation of a portion of the machine where the gathering rolls are located that assist in bringing the longitudinal edges of the blanks together prior to welding;

Figure 19 is a horizontal section taken approximately on the line 19—19 of Figure 18; and Figure 20 is an explanatory view showing how the gathering rolls function to insure that the longitudinal edges of the blank are brought together.

The machine shown in the drawings comprises a bed casting 20 supported on three pedestals 21, 22 and 23 (Figures 1, 2 and 9). A steel fin 24 is secured to the bed casting and extends longitudinally of the machine. The particular machine illustrated in the drawings has eighteen roll stands numbered consecutively from 1 to 18 in Figure 1. The upper rolls are mounted at the outer ends of driving shafts 25 which extend through the bed casting as shown in Figure 2 and are power-driven at the rear of the machine in a manner hereinafter described. The ends of the shafts at the front of the machine are journaled in a number of outboard bearing castings 26. The lower rolls of roll stands Nos. 3 to 18, inclusive, are mounted on short shafts 27 (as best shown in Figure 12) journaled in bearing castings 28 supported by the fin. The rolls of roll stands Nos. 1 and 2 are merely feed rolls. The rolls of No. 3 roll stand are idler rolls. The rolls of the fourth to the seventh stands are not only feeding rolls but are also forming rolls of the kind hereinafter described to produce the above mentioned humped up portion on the blanks. The rolls of the eighth to fifteenth stands are feeding rolls with flat treads that permit the opposing edges of the longitudinal seam of each blank to come together, as later described. The welding of the seam is performed between the fifteenth and sixteenth roll stands, the rolls of the sixteenth stand being similar to those of the fifteenth. The rolls of the seventeenth and eighteenth stands roll out the humped up portion of the blanks produced by the forming rolls.

The tubular blanks B which the machine was particularly designed to weld, and which will hereinafter be called barrel blanks, are made of fairly thin gauge sheet metal and have been previously formed to tubular shape to bring the longitudinal edges of the blank adjacent each other to form the longitudinal seam to be welded. At the time the barrel blanks reach the machine the springiness inherent in them either causes the edge portions of the blank along the seam to overlap or causes the opposing edges to be pressed together. As each barrel blank is fed to the machine it is opened up by hand to space its seam edges apart and the blank is moved onto a horn 28' at the left end of the machine, as viewed in Figures 1 and 2, with the seam edges against opposite sides of the fin 24 (Figure 9). The portion of the fin which lies between the seam edges during the passage of the blank through the machine is of uniform thickness from the feed end of the machine to a point between the ninth and tenth roll stands, and then tapers down to zero thickness at a point indicated at 29 just in advance of the twelfth roll stand. Up to this point the fin is provided with a series of individual openings 30, one for each of the first ten roll stands.

After the barrel blank has been placed on the horn 28' with the seam edges against opposite sides of the fin, it is moved by hand until its forward end enters the pass between the upper and lower rolls of No. 1 roll stand. The upper rolls of this stand are driven by power and the lower rolls are idlers. Each of the lower rolls is mounted on an arm 31, only one of which appears in Figure 1. Each of these arms is urged upwardly by a spring 32 to bring its roll into yielding contact with the corresponding upper roll. Each of the upper power-driven rolls has a replaceable plastic tire 32' (Figure 17) which provides a friction drive against the surface of the barrel blank. It will be understood that one upper and one corresponding lower roll engage the barrel blank at one side of the seam and the other upper and corresponding lower roll engage it at the opposite side of the seam.

The rolls of stand No. 1 feed the barrel blank into the machine until its forward end strikes two stops 33 located at the crimping station and just to the rear of the crimping dies. Figure 17 best shows the location of the stops 33 relative to the feed rolls of stand No. 1, while Figures 13 and 14, drawn to a larger scale, better illustrate their construction. In Figures 13 and 17 only one of the stops appears, but there is one at each side of the fin 24, as shown in Figure 14, to engage the forward end of the barrel blank at opposite sides of the seam. They arrest the forward movement of the blank during the crimping operation, and during this time the tires on the upper power-driven rolls of stand No. 1 slip on the surface of the blank. Just before the forward end of the barrel blank engages the stops 33 it engages a pair of switch actuators 34, one of such switch actuators being associated with each of the stops. The lower ends of the switch actuators are moved rearwardly with the blank until the motion of the blank is arrested by the stops 33. The switch actuators close two micro switches, later described, and through relays cause power to be supplied to a solenoid that operates the crimping mechanism to crimp the forward end of the barrel blank at either side of the seam. The reason for two switch actuators is to prevent the crimping mechanism from operating before both portions of the blank at opposite sides of the seam are in proper position to be crimped. Sometimes the barrel blank is slightly canted as it comes into the crimping mechanism. The two micro switches are connected in series so that no power is supplied to the crimper-operating solenoid until the barrel blank has straightened itself and both edge portions at opposite sides of the seam are up against the two stops 33. The use of the two stops at this location functioning as just described to cause the barrel blank to straighten itself, and which are then withdrawn from the path of the blank as later described to permit its travel to be resumed, would be advantageous even if no crimping operation were performed on each arrested blank, because of the straightening of the blank is desirable before it is fed into subsequent rolls.

Before describing the stops 33 and the switch actuators 34 in greater detail the crimping mechanism will be described as this will make the location and operation of the stops and switch actuators more readily understood.

At each side of the fin there is a hammer 35 which slides in a vertical guideway. Since the shape of this hammer is not entirely clear from Figure 13, the hammer has been illustrated separately on a reduced scale in Figures 15 and 16. As shown in these figures, the hammer itself comprises a rectangular plate 36 having a boss 37 projecting from its outer face, the upper end of which is spaced from the corresponding portion of the plate, as best shown in Figure 16, to receive the lower end of an operating link 38 (Figures 13 and 17). Aligned openings 39 in the upper end of the boss 37 and the opposite portion of the plate 36 receive a pin 40 which pivotally connects the link to the hammer. Each hammer has secured to it just below the boss 37 a crimping die 41. The die is attached to the hammer by means of a bolt 42 (Figure 13) which passes through the die and is threaded into an opening 43 in the hammer plate (Figures 15 and 16). Just below each hammer die 41 there is a corresponding stationary anvil die 44. The upper and lower dies are so shaped that when the two hammers descend the dies will crimp the forward edge of the barrel blank to an ogee curve at either side of the seam. The crimps extend rearwardly but a short distance—about ¾ of an inch—and then merge with the cylindrical wall of the blank. Two of the crimps thus formed at the forward edge of the barrel blank at opposite sides of the seam are represented at c in Figures 10 and 11.

Each operating link 38 is pivotally connected at its upper end to a crank arm 45 (Figures 9 and 17) secured to a rock shaft 46. This shaft carries an arm 47 which is pivotally connected to the lower end of a core 48 of the electric solenoid hereinbefore mentioned and shown at 49 in Figures 1 and 9. The rock shaft 46 also has attached to it a pair of oppositely extending arms 50 at the end of each of which is a weight 51. These weights act as a flywheel when the hammers are actuated by the solenoid to impart greater striking force to them and the dies which they carry.

Returning now to the description of the stops 33 and the switch actuators 34, each of the former is mounted to slide vertically on the outer face of the corresponding hammer 35. A cover plate 52, shown partly broken away in Figure 13 to expose some of the underlying parts, confines the stop and assists in guiding it. The upper end of the stop 33 carries a pin 53 (see particularly Figures 13 and 14) which passes at its upper end through a guide 54 secured to the cover plate 52. An adjustable nut 55 on the pin 53 limits the downward movement of the stop 33. A coil spring 56 reacting at its lower end against the top of the stop 33 and at its upper end against the lower face of the guide 54 yieldingly holds the stop 33 in its lower position in the path of the forward edge of the incoming blank.

Each of the two stops 33 has an outwardly extending pin 56 on the outer end of which the corresponding limit switch actuator 34 is pivoted at its upper end, as best shown at the left side of Figure 14. The cover plate 52 has a slot 57 through which the pin 56 projects and which permits vertical movement of the pin when the stop 33 moves vertically, as hereinafter described. Each switch actuator is biased toward the feed end of the machine by a leaf spring 34ª which yieldingly holds the lower end of the switch actuator slightly in advance of the lower end of the corresponding stop 33 (Figure 13).

When the forward edge of the incoming barrel blank moves the lower ends of both switch actuators 34 rearwardly before the motion of the blank is arrested by the two stops 33, screws 34ᵇ adjustably mounted on the switch actuators (Figure 13) engage with the buttons 59 of the two above mentioned micro switches and close them. One of these micro switches is shown at 60 in Figures 13 and 17, but it will be understood that there is one of them at each side of the fin 24. Both of them are connected in series with the crimper-operating solenoid 49 as above stated. Therefore, when the barrel blank is sufficiently straight to move both switch actuators 34 far enough to close both micro switches 60, the solenoid 49 is energized to move its core 48 upwardly (Figure 1). This rocks the shaft 46 counterclockwise as viewed in Figures 1 and 17, and through the crank arms 45 and links 48, moves the two hammers 35 downwardly, thus causing the two crimping dies 41 attached to the lower ends of the hammers to cooperate with the stationary dies 44 and crimp the forward edge of the blank at two places as above described. Of course, during this operation the barrel blank remains stationary because its forward edge is in engagement with the two stops 33. By the time each hammer has reached the lower end of its stroke an adjustable screw 61 mounted in a bracket 62 attached to the side of the hammer, as shown in Figure 13, has operated the button 63 of a limit switch 64. The two limit switches 64 (there being one at each side of the fin 24) are normally closed to complete the circuit to the solenoid 49, but when they are opened by descent of the hammers 35, the circuit of the solenoid is broken and the solenoid core 48 is returned to starting position by means of a spring (not shown), thereby returning the hammers to their raised position. A pair of normally open switches 64' (only one of which appears in Figures 13 and 14) are closed by the upper ends of the switch-actuating screws 61 when the hammers reach their raised position to reset the solenoid circuits. As each hammer is returned to raised position it lifts the corresponding stop 33 and the corresponding switch actuator 34 out of the path of the blank that has just been crimped. This is accomplished as follows:

Each of the stops 33 houses a latch lever 65 which is fulcrumed intermediate its ends on the pin 56 which serves as the pivotal mounting for the switch actuator 34 as above described. The lower end of the latch lever is biased in a clockwise direction by a coil spring 66 (Figure 13), so that upon upward movement of the hammer a notch 67 in the upper corner of the hammer die 41 engages the extreme lower end of the latch lever 65 and thus causes the latch lever to rise with the hammer and carry with it the corresponding stop 33 and switch actuator 34. As soon as the lower ends of the stops and switch actuators have cleared the forward edge of the blank, the blank resumes its forward travel. The upper end of each latch lever has a cam surface 68 which is adapted to move into engagement with a roller 69 as the corresponding hammer approaches the upper limit of its stroke. This rocks the latch lever about the axis of the pin 56 and thereby moves the lower end of the latch lever counterclockwise, as viewed in Figure 13, to disengage it from the notch 67 in the hammer die, whereupon the previously described coil spring 56 returns the stop 33 to its lower position, carrying with it the corresponding switch actuator 34. The two stops move downwardly until their lower ends rest on the surface of the barrel blank that has just been crimped. When the full length of the barrel blank has passed under the stops 33 they drop back into their original position ready to stop the next blank in position to have its forward edge crimped.

The barrel blank moves forwardly between the upper and lower rolls of stand No. 2, which as above stated are feed rolls similar to those of the first stand, the upper rolls being power-driven and having plastic tires, and the lower rolls being idlers. The blank is fed forwardly by the feed rolls of the first and second stands and moves between the upper and lower rolls of stand No. 3, which as above stated are idler rolls. The blank now reaches the first forming rolls, namely, those of stand No. 4. These rolls and all subsequent rolls are driven at uniform speed that is only one-half the speed of the friction feed rolls of stands Nos. 1 and 2. The purpose of driving the rolls of the first two stands faster than the other rolls is to permit each barrel blank that has been stopped for crimping to again catch up to the preceding blank that is moving through the machine. In operating the machine, the barrel blank is crimped and sent forward before the trailing edge of the preceding blank has passed beyond the fourth roll stand. Thus, the blank that has been stopped for the crimping operation catches up to the preceding blank before the rear portion of the preceding blank has left the rolls of stand No. 4, which are driven at reduced speed, and before the speed of travel of the catching-up blank has been slowed down by entering the rolls of the fourth stand. Thus, there is no gap between the trailing edge of the preceding blank and the forward edge of the following blank during the further travel of these blanks through the machine, and therefore all of the blanks move through the machine in abutting relation as previously described, the crimping at the forward edge of each blank being for the purpose of preventing the blanks, thus abutting, from overlapping or riding up on one another.

The machine can be used for welding barrel blanks of different size, but one size blank is indicated in Figure 1 in dotted lines at B. It will be seen that a blank of the size indicated is in the grip of the rolls of four roll stands at the same time.

As previously stated, the rolls of stands Nos. 4, 5, 6 and 7 are forming rolls. The rolls of stands Nos. 4, 5 and 6 form the edge portion of the barrel blank at either side of the seam to the shape shown in Figure 4. The rolls of stand No. 7 give the edge portions the shape shown in Figure 5.

A description of the rolls of one of the forming roll stands will suffice for all of them since they differ only in the cross-sectional shape of their forming treads, and therefore the forming rolls of stand No. 7 which bring the edge portions of the blank to the shape shown in Figure 5, will be described. These rolls are shown in cross-section in Figure 12. There is one upper roll and a complementary lower roll. The upper roll is made up of three portions, namely, an intermediate portion 70 which extends into the gap between the opposing edges of the barrel blank at the open seam, and outer portions 71 and 72. The three portions of the upper roll are clamped to its driving shaft 25, previously described. The lower roll is likewise made up of three portions 73, 74 and 75 which are clamped together and mounted to rotate on the previously described short shaft 27. This shaft is stationary and the lower roll is mounted upon it by means of roller bearings 76. The outer portions 73 and 74 of the lower roll extend radially beyond the intermediate portion 75 to form an annular groove 77 adapted to receive the intermediate portion 70 of the upper roll. The treads of the outer portions of the upper roll are complementary in shape to those of the outer portions of the lower roll and are designed to bring the edge portions of the barrel blank to the shape shown in Figure 5. The lower shaft 27 is mounted at its ends in eccentric bushings 78, each of which may be turned by a nut 79 so that the pressure of the rolls against the blank may be adjusted.

As previously stated, the rolls of the eighth to fifteenth stands bring the separated edges of the blank together. Each of these roll stands has two upper rolls and two lower rolls, all with flat treads. One upper roll and the corresponding lower roll engage the barrel blank at one side of the seam and outwardly of the humped up portion on the blank at that side of the seam, and the other upper roll and its corresponding lower roll similarly engage the blank at the opposite side of the seam. The fin 24 begins to taper at a point between the ninth and tenth roll stands as previously stated, so that when the twelfth roll stand is reached by the barrel blank no portion of the fin lies between the opposing edges of the blank. Therefore, the barrel blank edges are progressively brought together by the rolls and by the inherent resiliency of the blank as the blank moves along the tapered portion of the fin, and when the blank is engaged by the rolls of stands Nos. 12, 13, 14 and 15, the edges of the blank are in abutting relation, or substantially so (Figure 6), throughout the entire length of the blank. To insure that the edges of the blank along the seam are brought together before the welding position is reached, there is provided between the thirteenth and fourteenth roll stands a set of gathering rolls shown at 80 in Figure 1 and illustrated in detail in Figures 18 to 20. Referring to Figures 18 to 20, the set of gathering rolls comprises a pair of upper and lower rolls at either side of the blank seam. The two rolls of one pair are represented at 81 and 82, and those of the other pair are represented at 83 and 84 (see particularly Figure 20). As shown in this figure, the rolls of the two pairs are toed in toward the seam of the blank. Each of the four rolls has a plastic tire to allow for slippage between the rolls and the surfaces of the blank. Each of the upper rolls 81 and 83 is mounted at one end of an arm 85 (Figures 18 and 19) which is pivoted at its other end to a stationary bracket 86. Each of the arms 85 is spring-pressed downwardly by means of a coil spring 87. Each of the lower rolls 82 and 84 is similarly mounted at one end of an arm 88, the other end of which is pivoted to a fixed part of the machine. The arm 88 rests on the end of an adjusting screw 89 by means of which the gap between its roll and the corresponding upper roller may be varied. The two upper rolls 81 and 83 are power-driven, and the two lower rolls 82 and 84 are idlers. Each of the upper rolls is rigidly connected to a gear 90 which meshes with a gear 91 on a countershaft 92. The countershaft is driven by means of gears 93 mounted on it which mesh with driving gears 94 carried by the driving shaft of the upper rolls of the thirteenth roll stand. It will thus be seen that the power-driven upper rolls 81 and 83 positively bring the opposing edges of the blank together, due to the toeing in of the rolls, and insure that the seam is closed, or substantially so, from this point on in the travel of the blank.

The welding of the seam may be accomplished by any suitable means, but preferably it is done by an oxyacetylene welding torch having a block type tip shown at 95 in Figure 1. As will be seen from this figure, the welding torch is located between the fifteenth and sixteenth roll stands and this portion of the machine therefore constitutes a welding station. The torch tip projects a row of flame jets against the edges of the barrel blank along the seam as the blank moves under the torch and welds the edges together in a manner well understood in the art of tube welding.

At the welding station where the torch 95 is located, the portion of the blank at the seam has the cross-sectional shape shown in Figure 6, the opposing edges of the blank having come together, or having been forced together by the gathering-in rolls, as shown in Figure 20. That is, the portion of the blank where the seam is located now has the cross-sectional shape of the upper half of a small diameter tube, or the cross-sectional shape of a single longitudinal corrugation, with the seam at the very top. This shape imparts sufficient stiffness to the relatively thin gauge metal to eliminate the necessity of supporting the blank during the welding operation close to its edges by metal clamping means or the like, and therefore, heat which would otherwise be conducted away by instrumentalities of this sort is conserved as hereinbefore stated.

The rolls of the sixteenth stand are similar to those of the fifteenth stand and do not change the shape of the humped up portion of the barrel blank. However, as the blank passes between the rolls of the seventeenth and eighteenth stands, the humped up portion is progressively rolled down to the curvature of the blank, as shown in Figures 7 and 8. The weld produced is thicker than the material of the blank and since the rolls of the seventeenth and eighteenth stands roll the metal while it is still hot from the welding operation, the metal of the weld is changed from cast to wrought form. These rolls also have the function of restoring the seam to its original length and straightening it after the shrinkage which occurs during welding and which distorts the seam to a downwardly concave shape as viewed in longitudinal vertical section.

The last three rolls shown at the discharge end of the machine in Figures 1 and 2, and designated 96, 97 and 98, are merely idlers that serve as a roller conveyor for the blanks as they come from the machine. Since the longitudinal seams of the blanks are welded while the blanks are in abutting relation, they will ordinarily be welded to one another at the ends of the seams, but each blank may be readily broken from the succeeding one as it leaves the machine by an attendant stationed at the discharge end of the machine for this purpose.

The driving means for the shafts 25 on which the upper rolls of the various roll stands are mounted is shown in Figure 2. An electric motor 99 drives a shaft 100 through a sprocket chain 101. This shaft connects with the aligned shafts of a number of speed reducing units 102. Each of the speed reducing units directly drives one of the roll shafts 25. As will be seen from Figures 1 and 2, the speed reducing units directly drive the shafts 25 of the upper roll of roll stands Nos. 4, 7, 14 and 17. The other roll shafts are driven through gear connections to the shafts that are directly driven by the speed reducing units as shown in Figure 2. It is of course necessary to use idler gears between the gears on the roll shafts to cause all of the rolls to turn in the same direction. As hereinbefore stated, the rolls of No. 3 roll stand are idlers and are not driven at all, and the gearing which drives the shafts of the upper rolls of No. 1 roll stand and No. 2 roll stand is such as to drive these rolls at twice the speed of the other rolls.

The blanks are supported from below as they travel through the machine on the upper run of a conveyor that is located under the machine, as indicated in Figure 1. The frame of the conveyor includes two channel beams 103 (see also Figure 9) connected together at their ends by cross members 104. A leg 105 extends downwardly from each cross member 104 through a bearing sleeve 106 carried by a bracket 107 which is attached to the corresponding end pedestal of the machine frame. The bearing sleeves 106 are long enough to give the conveyor lateral stability. A screw 108 (Figure 1) fastened to each of the cross members 104 passes through a portion of the corresponding bracket 107 and has nuts 109 for adjusting the height of the conveyor frame so that the conveyor can be made to hold the barrel blanks at exactly the right height with respect to the edge gripping rolls.

At each end of the conveyor there is an axle 110 mounted to turn in bearings secured to the channel beams 103. Each axle 110 carries two sprockets 111. The sprockets drive two endless chains 112, one of which passes around the two sprockets at one side of the conveyor and the other of which passes around the two sprockets at its other side. The axle 110 near the discharge end of the machine is driven by a sprocket 113 which receives power from the same motor (the motor 99) that drives the rolls of the machine. In the particular machine illustrated in the drawings this is accomplished by providing a vertical shaft 114 (Figures 1 and 2) which is driven from the upper roll shaft 25 of No. 13 roll stand through bevel gears 115 (Figure 2). At its lower end the vertical shaft 114 is geared to a cross shaft 116 under the machine which carries a sprocket 117. A chain 118 passing around this sprocket and the above described sprocket 113 on the conveyor axle 110 drives the conveyor from the motor 99. Any adjustment of the motor speed to increase or decrease the rate at which the edges of the barrel blanks are advanced through the rolls automatically produces a corresponding change in the speed of the conveyor, and consequently the conveyor always advances the barrel blanks at the same speed that the edges along the seam are advanced by the rolls.

The conveyor chains 112 are connected by cross members 119 (Figure 9). Any desired number of these cross members may be employed but they are preferably spaced about 12" apart along the length of the conveyor. Each end of the cross member 119 is connected to the corresponding conveyor chain by means of a block 120 connected to its chain by a small plate 121. Each block 120 carries a pair of wheels 122 (only one wheel of each pair appears in Figure 9) and these wheels run on rails 123 supported on the channel beams 103. The barrel blanks B are supported by the upper run of the conveyor on the cross members 119, as shown in Figure 9, and as the cross members are moved by the conveyor chains from the feed end of the machine to its discharge end they are supported at their ends by the wheels 122 running on the rails on the channel beams 103, thereby firmly supporting the barrel blanks from below during their travel through the machine. More detailed illustration and description of the conveyor is not necessary for a full understanding of the invention since any type of conveyor may be employed so long as it functions to support the barrel blanks from below and is driven at the proper speed and is adjustable as already described. However, a conveyor functioning like that herein described has considerable importance in a machine for welding barrel blanks of the kind described, especially when the blanks are of relatively thin gauge metal.

I claim:

1. The method of welding the longitudinal seams of tubular barrel blanks and the like which comprises crimping each blank at only one of its circular edge portions and at a region spaced laterally from the seam to be welded to form a projection extending outwardly of the periphery of the blank as well as a projection extending inwardly of its periphery, continuously feeding the blanks by a welding station with the seams to be welded in alignment and while they are in abutting end-to-end relation and prevented from overlapping by the crimps in the circular edge portion of each blank, and welding the seams successively and progressively as they pass the welding station.

2. The method of welding the longitudinal seams of tubular barrel blanks and the like which comprises crimping the forward edge portion only of each blank at opposite sides of the seam to be welded and at regions spaced laterally therefrom to form a projection extending outwardly of the periphery of the blank as well as a projection extending inwardly of its periphery, continuously feeding the blanks by a welding station with the seams to be welded in alignment and while they are in abutting end-to-end relation and prevented from overlapping by the crimps in the forward edge portion of each blank, and welding the seams successively and progressively as they pass the welding station.

3. The method of welding the longitudinal seams of tubular barrel blanks and the like which comprises feeding the blanks successively to a crimping station, arresting the motion of each blank at the crimping station, while the blank is stationary at the crimping station crimping the forward edge portion only of each blank at a region spaced laterally from the seam to be welded to form a projection extending outwardly of the periphery of the blank as well as a projection extending inwardly of its periphery, allowing the crimped blank to resume its forward travel, feeding each crimped blank forwardly at reduced speed whereby the succeeding crimped blank will catch up to it and abut against its rear end but will not overlap it due to the crimps on the succeeding blank, feeding the blanks by a welding station while they are in abutting end-to-end relation with the seams to be welded in alignment, and welding the seams successively and progressively as they pass the welding station.

4. The method of welding the longitudinal seams of tubular barrel blanks and the like which comprises feeding the blanks successively to a crimping station, crimping the forward edge portion of each blank at the crimping station to form a projection extending outwardly of the periphery of the blank as well as a projection extending inwardly of its periphery, forming the edge portions of each blank along the seam to produce a single longitudinal corrugation projecting outwardly on the blank with the seam at the crest of the corrugation, feeding the crimped blanks forwardly in abutting end-to-end relation with the seams to be welded in alignment, successively and progressively welding the seams, and then rolling the corrugation on each blank down to the curvature of the tubular blank.

5. The method of welding the longitudinal seams of tubular barrel blanks and the like which comprises feeding the blanks successively to a crimping station with the seams to be welded in alignment, arresting the motion of each blank at the crimping station, crimping the forward edge portion of each blank at the crimping station while the blank is stationary to form a projection extending outwardly of the periphery of the blank as well as a projection extending inwardly of its periphery, allowing the crimped blank to resume its forward travel, feeding each crimped blank forwardly at reduced speed whereby the succeeding crimped blank will catch up to it and abut against its rear end but will not overlap it due to the crimps on the succeeding blank, rolling the edge portions of each blank along the seam to produce a single longitudinal corrugation projecting outwardly on the blank with the seam at the crest of the corrugation, successively and progressively welding the seams as the blanks pass a welding station, rolling the corrugation on each welded blank down to the curvature of the tubular blank, and as each welded blank reaches a position farther along in its travel breaking it away from the succeeding welded blank at the point where the two blanks are welded together should this be necessary.

6. A machine for welding the longitudinal seams of tubular barrel blanks and the like comprising a crimping station to which the blanks may be fed successively with the seams to be welded in alignment, friction feed rolls for feeding the blanks to and beyond the crimping station, stop means for arresting the travel of each blank at the crimping station, means at the crimping station for crimping the forward edge portion of the blank while it is stationary, means adapted to be actuated by the blank as it reaches the crimping station for automatically causing operation of the crimping means, means for actuating the stop means to release the blank after it has been crimped and thereby permit it to resume its forward travel, other feed rolls located beyond said friction feed rolls and between which the edge portions of the blank pass, means for driving said last-named rolls and the friction feed rolls so that the former are driven at less speed than the latter whereby each crimped blank catches up to the blank ahead of it and abuts against its rear end, and welding means for successively and progressively welding the seams of the blanks as they move by it in abutting end-to-end relation.

7. A machine for welding the longitudinal seams of tubular barrel blanks and the like comprising welding means, means for feeding the blanks to and by the welding means while the blanks are in abutting end-to-end relation with the seams to be welded in alignment whereby the seams of the blanks are successively and progressively welded, and means near the feed end of the machine for crimping the forward edge portion only of each blank whereby the blanks when moved to and by the welding means in abutting end-to-end relation will not overlap one another.

8. A machine for welding the longitudinal seams of tubular barrel blanks and the like comprising a crimping station, friction feed rolls for feeding the blanks to and beyond the crimping station, means for holding the seam edges of the blanks apart as they are fed to the crimping station, a pair of stops for arresting the travel of each blank at the crimping station, said stops being located so as to be engaged by the forward edge of a blank at opposite sides of its open seam, crimping mechanism at the crimping station including two sets of dies for crimping the forward edge of the blank at opposite sides of its open seam while the blank is stationary, means operating when both forward edge portions of the blank at opposite sides of its open seam are against said stops to operate the crimping mechanism and cause the dies to crimp the forward edge portion of the blank at opposite sides of the open seam, means for actuating the stops to release the blank after it has been crimped and thereby permit it to resume its forward travel, other feed rolls located beyond said friction feed rolls and between which the edge portions of the blank along the seam pass, means for driving said last-named rolls and the friction feed rolls so that the former are driven at less speed than the latter whereby each crimped blank catches up to the blank ahead of it and abuts against its rear end before the blanks reach the welding station, means for allowing the separated seam edges of the blanks to come together before the blanks reach the welding station, and means at the welding station for successively and progressively welding the seams of the blanks as they move by it in abutting end-to-end relation.

9. A machine for welding the longitudinal seams of tubular barrel blanks and the like comprising welding means, feed rolls for feeding a blank to and by the welding means whereby its seam is progressively welded, said feed rolls engaging the blank at opposite sides of its seam, friction feed rolls for feeding the blank into the machine and to said first-named feed rolls, a pair of stops for arresting the travel of the blank before it reaches said first-named feed rolls, said stops being located so as to be engaged by the forward edge portions of the blank at opposite sides of its seam, and means operating only when both of said forward edge portions of the blank have been brought against both of said stops to remove the stops from the path of travel of the blank and thereby permit it to advance to the first-named feed rolls.

10. The method of welding the seams of metal objects which comprises shaping the edge portions of the metal along the seam to form a single longitudinal corrugation on the work with the seam at the crest of the corrugation, supporting the object solely at points beyond the corrugation, progressively welding the seam of the object so supported, and rolling out the corrugation after the weld is completed and while the metal along the corrugation is still hot from the welding operation.

11. The method of welding the seams of metal objects which comprises shaping the edge portions of the metal along the seam to form a single longitudinal corrugation on the work with the seam at the crest of the corrugation, supporting the object solely at points beyond the corrugation, feeding the object so supported past a welding station to progressively weld the seam thereof, and rolling out the corrugation after the weld is completed and while the metal along the corrugation is still hot from the welding operation.

12. The method of welding the longitudinal seams of tubular blanks of relatively large diameter made of relatively thin gauge metal such as barrel blanks which comprises shaping the edge portions of the metal along the seam to form a longitudinal corrugation on the blank with the seam at the crest of the corrugation, supporting the blank solely at points remote from the seam to minimize the conduction of heat from the metal adjacent said seam as it is welded, thereafter progressively welding the seam of the blank so supported, and progressively rolling out the corrugation after the weld is completed and while the metal adjacent the seam is still hot from the welding operation.

JAMES L. ANDERSON.

(References on following page)

REFERENCES CITED

The following references are of record in the file of this patent:

UNITED STATES PATENTS

| Number | Name | Date |
|---|---|---|
| 832,301 | Eldridge | Oct. 2, 1906 |
| 842,926 | Walsh | Feb. 5, 1907 |
| 1,703,037 | Heck | Feb. 19, 1929 |
| 1,850,176 | Lawson | Mar. 22, 1932 |
| 1,976,343 | Heineman | Oct. 9, 1934 |
| 1,980,164 | Boyle et al. | Nov. 13, 1934 |
| 1,996,775 | Sims | Apr. 9, 1935 |
| 2,010,155 | Hull et al. | Aug. 6, 1935 |
| 2,052,380 | Chapman | Aug. 25, 1936 |
| 2,187,740 | Hothersall | Jan. 23, 1940 |